United States Patent
Jatti et al.

(10) Patent No.: US 12,192,575 B2
(45) Date of Patent: *Jan. 7, 2025

(54) METHOD AND SYSTEM FOR ADVANCED CUSTOMER BUG REPORTING

(71) Applicant: ARRIS ENTERPRISES LLC, Suwanee, GA (US)

(72) Inventors: Vinod Jatti, Bangalore (IN); Murali S. Sahasranaman, Bangalore (IN); Virendra Singh, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,046

(22) Filed: Oct. 17, 2022

(65) Prior Publication Data

US 2023/0041913 A1 Feb. 9, 2023

Related U.S. Application Data

(63) Continuation of application No. 17/167,180, filed on Feb. 4, 2021, now Pat. No. 11,503,368.

(60) Provisional application No. 62/981,576, filed on Feb. 26, 2020.

(51) Int. Cl.
*H04N 21/4425* (2011.01)
*G06F 3/16* (2006.01)
*H04N 21/41* (2011.01)
*H04N 21/422* (2011.01)

(52) U.S. Cl.
CPC ........ *H04N 21/4425* (2013.01); *G06F 3/167* (2013.01); *H04N 21/41265* (2020.08); *H04N 21/4221* (2013.01)

(58) Field of Classification Search
CPC ......... H04N 21/4425; H04N 21/41265; H04N 21/4221; G06F 3/167
See application file for complete search history.

(56) References Cited

U.S. PATENT DOCUMENTS

| | | | |
|---|---|---|---|
| 2016/0198161 A1* | 7/2016 | Samuelsson | H04N 21/4425 375/240.27 |
| 2017/0116987 A1* | 4/2017 | Kang | G06F 3/03 |
| 2020/0213665 A1* | 7/2020 | Rege | H04N 21/2404 |

* cited by examiner

*Primary Examiner* — Yassin Alata
(74) *Attorney, Agent, or Firm* — Panitch Schwarze Belisario & Nadel LLC

(57) ABSTRACT

A method and system are disclosed for capturing observations of customer-premise equipment or customer-provided equipment (CPE) devices. The method includes reporting a problem detect by a user during use of a customer-premise equipment or customer-provided equipment (CPE) device with one or more specific buttons on a remote controller; and entering the problem into a log with a timestamp.

20 Claims, 6 Drawing Sheets

METHOD AND SYSTEM FOR ADVANCED CUSTOMER BUG REPORTING

TECHNICAL FIELD

The present disclosure generally relates generally to a method and system for advanced customer bug reporting, and more particularly to a method and system for capturing observations of customer-premise equipment or customer-provided equipment (CPE) devices, which includes reporting a problem detected by the user during a use of a customer-premise equipment or customer-provided equipment (CPE) device with one or more specific buttons on a remote controller.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

Subscribers connect their computers, routers, voice-over-IP telephones and other devices to this network through the network terminals, for example, cable modems (CM) or network gateways. The network terminals, for example, cable modems (CM) or network gateways include hardware which runs software that provides the low-level control for the device's specific hardware, which is known as firmware, which can be updated by pushing a new firmware version (or image) from time to time to the network gateway, for example, the cable modem (CM) or gateway. In some situations, it may be desirable to roll-back the firmware version or image to the previous version of the firmware or image.

Cable service providers also have a wide range of customer-premise equipment or customer-provided equipment (CPE) products, for example, modems, routers, Wi-Fi enabled set-tops, etc., which are deployed in the home or business. When the platform detects any stability issues, defined procedures automatically report the captured logs to the headend or the customer care center for further analysis. However, there is a drawback in the current procedures since this mechanism can only report what is detected within the CPE product or device. For example, a problem can be observed by the user and the device may not even know anything about the problem.

For example, problems can include that the telephony status on the modem may show green, but the Voice over Internet Protocol (VOIP) calls are failing, macroblocks/intermittent jitters are seen while watching a channel or a content (i.e., television channel) on a hand-held device, and/or download speeds are slower or less than usual despite the light emitting diodes/user interface (LEDs/UI) status indicating a rather healthy operational status. In accordance with an exemplary embodiment, the above-mentioned problems often cannot be detected by devices and can only be observed by customers. Traditional methods of customer care calls can also be cumbersome and with today's highly advanced automation ecosystem, the consumer expectation is that the above-described scenarios are handle as part of the automation itself rather than relying on phone calls to customer care.

SUMMARY

In accordance with exemplary embodiments, it would be desirable to have a system and method that can capture the customer's observations into the logging ecosystem rather seamlessly so that the end-user's direct observations can be recorded and visible to the customer care along with the regular logs, for example, obtained by cable server providers.

In accordance with an aspect, a method is disclosed for capturing observations of customer-premise equipment or customer-provided equipment (CPE) devices, the method comprising: reporting a problem detect by a user during use of a customer-premise equipment or customer-provided equipment (CPE) device with one or more specific buttons on a remote controller; and entering the problem into a log with a timestamp.

In accordance with an another aspect, a system is disclosed for capturing observations of users of customer-premise equipment or customer-provided equipment (CPE) devices, the method comprising: a customer-premise equipment or customer-provided equipment (CPE) device; a remote controller, the remote controller configured to report a problem with the CPE device using one or more specific buttons on the remote controller; and a cable service provide, the cable service provider configured to receive the problem from the remote controller in a log with a timestamp.

DETAILED DESCRIPTION

System for Advanced Customer Bug Reporting

Figure 1:
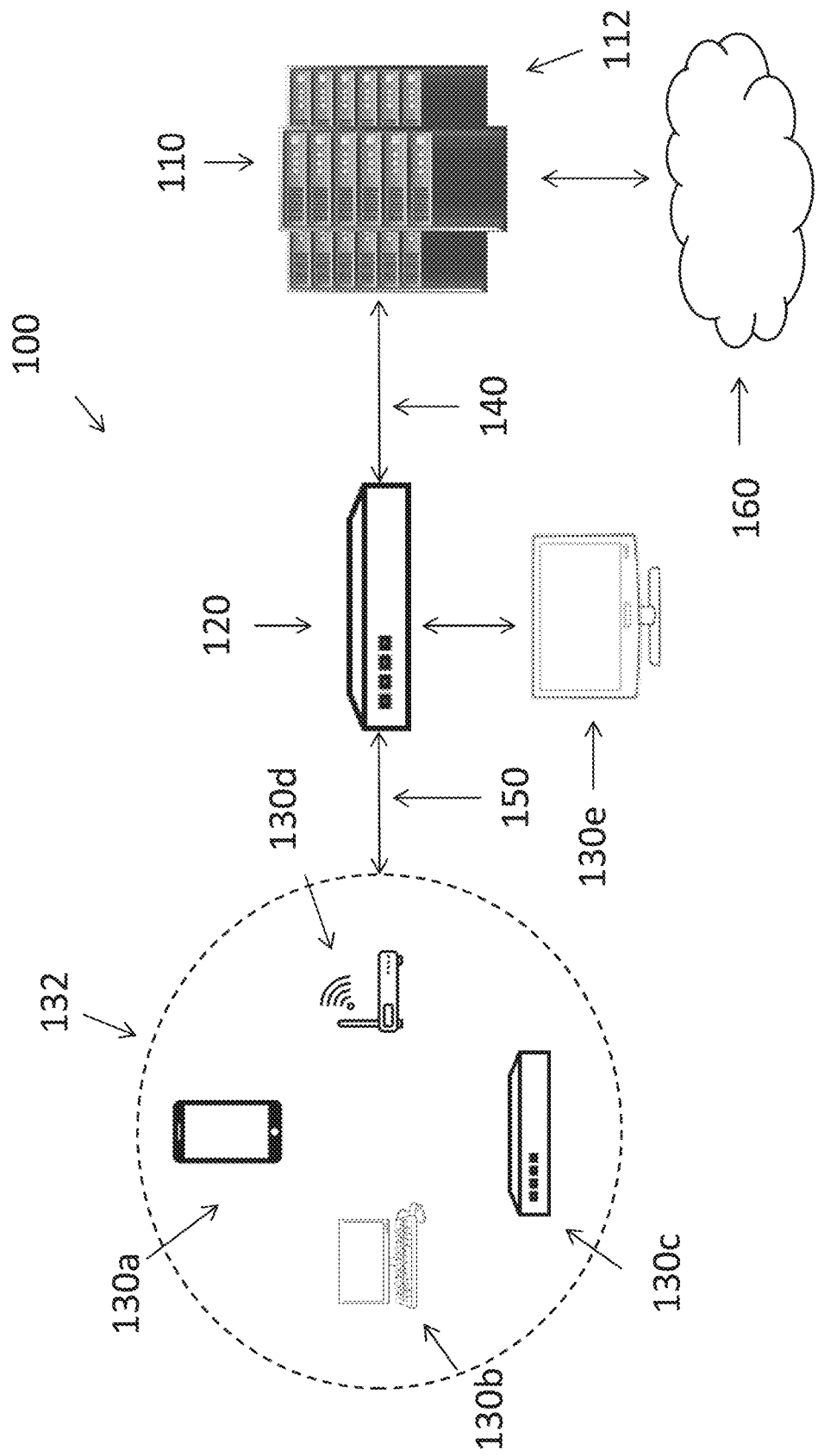
FIG. 1 is an illustration of an exemplary network environment for a system and method for advanced customer bug reporting.

FIG. 1 is a block diagram illustrating an example network environment 100 operable for advanced customer bug reporting. In embodiments, a network gateway 120 can provide, for example, video and/or data services to a plurality of devices 130*a*, 130*b*, 130*c*, 130*d*, 130*e*. The network gateway 120 may communicate with the plurality of devices 130*a*, 30*b*, 130*c*, 130*d* over a local network 132 (for example, a local area network (LAN), a wireless local area network (WLAN), a personal area network (PAN), etc.) and/or wired, for example, a television 130*e* connected to the network gateway 120, for example, a cable modem, and may communicate with an upstream wide area network (WAN) 160 through a connection 150 to a cable provider 110. The cable provider 110 can provide high-bandwidth data transfer, for example, cable television and broadband internet access via, for example, coaxial cables 140. The cable provider 110 can include one or more servers 112 configured to deliver services, for example, cable television and/or broadband internet and infrastructure supporting such services including management of image software and/or firmware.

In accordance with an exemplary embodiment, the plurality of devices 130a, 130b, 130c, 130d, 130e may be any type of customer-premise equipment or customer-provided equipment (CPE) products (i.e., computing device) configured to connect via a wireless network, for example, wireless network utilizing an IEEE 802.11 specification, including a set-top box (STB), a smart phone, a smart TV, a computer, a mobile device, a tablet, a router, a home security system, or any other device operable to communicate wirelessly with the network gateway 120. The network gateway 120 may provide access to an external network, such as the Internet, for any devices connected thereto via the area network 132. The area network 132 may be, for instance a local area. In accordance with an exemplary embodiment, the network gateway 120 may be a gateway device, an access point, a modem, a wireless router including an embedded modem, a wireless network extender or any other device operable to deliver, for example, data and/or video services from the provider 110 and/or a wide area network (WAN) 160 to one or more of the plurality of devices 130a, 130b, 130c, 130d, 130e.

In accordance with an exemplary embodiment, the network gateway 120 may communicate with the provider 110 over a wired or a wireless connection. A wireless connection between the provider 110 and the network gateway 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

Process for Advanced Customer Bug Reporting

In accordance with an exemplary embodiment, a customer-premise equipment or customer-provided equipment (CPE) or CPE device 120, for example, a Wi-Fi router is streaming content to a hand-held device 130a, for example, to an iPad 130a. The user may observe intermittent video jitters. In accordance with an exemplary embodiment, the problem could be either with the CPE device 120 (say video decode errors) or it may be due to poor bandwidth or even signal distortion due to external conditions. The streaming CPE device 120, for example, the Wi-Fi router may be unable to auto detect the issue and/or problem even though the customer has observed or continues to observe this problem.

Figure 2:
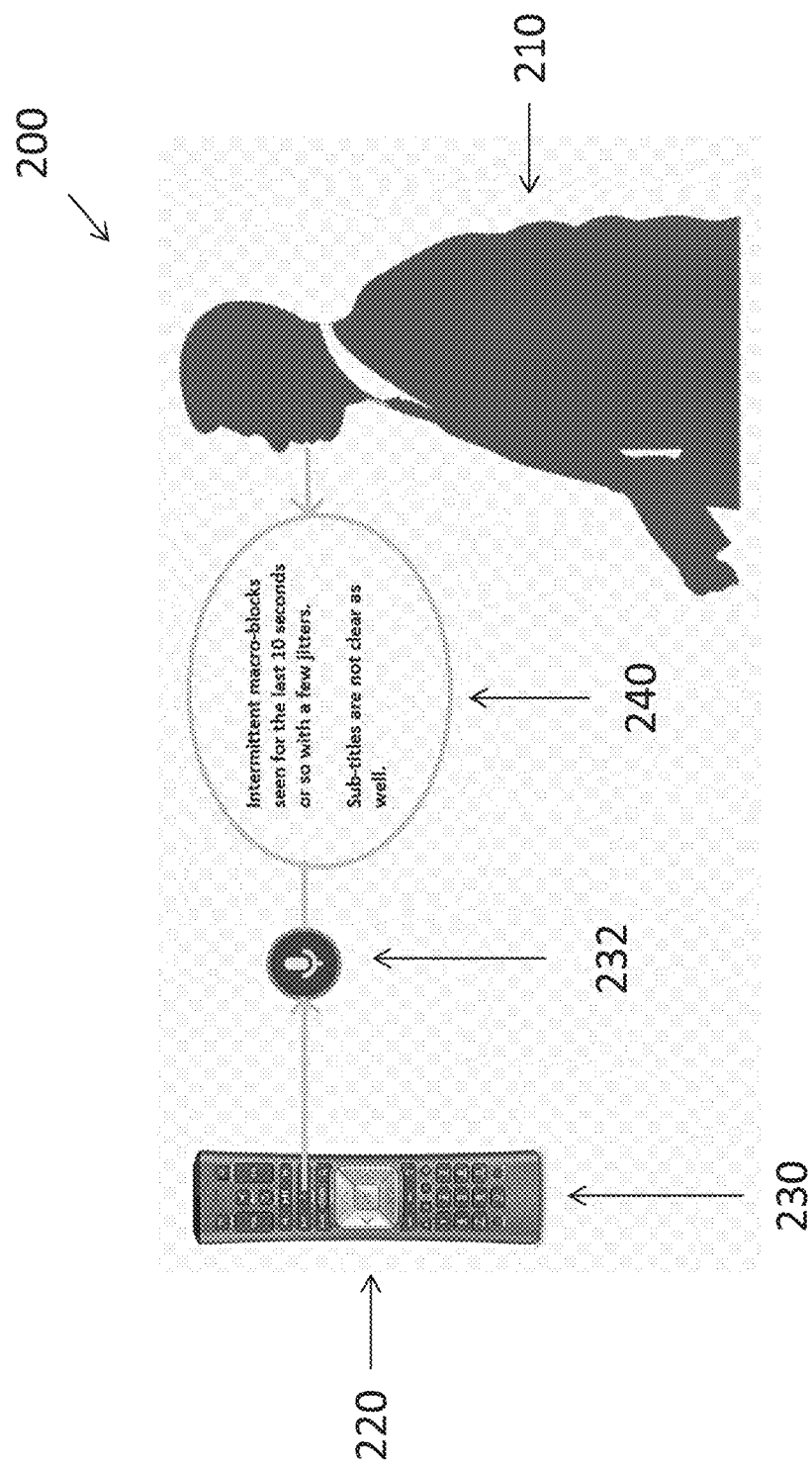
FIG. 2 is an illustration of a user communicating or interacting with a remote controller (RC) in accordance with an exemplary embodiment.

In accordance with an exemplary embodiment, a system and method are disclosed, which can include an automated program, which can be configured to encompass all the user's observations as part of the logging ecosystem and can be configured to collect information in support of these observations. In accordance with an exemplary embodiment, for example, as shown in FIG. 2, a remote controller (RC) 220 can be equipped with voice command 232 support, and customers can use the remote controller 220 to describe the problems seen. In case of a remote controller (RC) 220 without voice support (i.e., a legacy remote controller), a combination of buttons 230 can be programmed or used to report, for example, the customer's observations. In accordance with an exemplary embodiment, what the customer 210 reports 240 (i.e., talks to the remote controller (RC) Voice listener) is automatically appended to the logs (with the appropriate timestamp) for further analysis, for example, at a trouble shooting center.

In accordance with an exemplary embodiment, customer interaction with the CPE device 120 is not limited to use of buttons on a remote controller (RC) as disclosed herein. For example, the CPE device 120 may include a voice interface, which can support customer interaction via a supporting voice interaction.

In accordance with an exemplary embodiment, the regular system logs that are generally generated are shown below:
[2019-03-29 13:15:52.175] [89.984657]
[2019-03-29 13:15:52.175] [89.984684] lmac_24g=========LMAC Config=========
[2019-03-29 13:15:52.175] [89.984685] lmac 24g HW version: B0
[2019-03-29 13:15:52.175] [89.984686] lmac_24g PHY type: ELMA
[2019-03-29 13:15:52.190] [89.984687] lmac_24g PCIE type: SYNOPSYS PCIE [2019-03-29 13:15:52.190] [89.984688] lmac_24g MAC LA status: ON
[2019-03-29 13:15:52.190] [89.984689] lmac_24g==============================
[2019-03-29 13:15:52.206] [90.028289] [ChannelInfo]: new group: [1-13], max EIRP=20 dBm, flags=0
[2019-03-29 13:15:52.206]

In accordance with an exemplary embodiment, at time [2019-03-29 13:15:52.207], user reports an observation 240 to the remoter control (RC) 220 (i.e., Voice Listener). In accordance with an exemplary embodiment, user observations get embedded along with regular logs at the appropriate timestamp (underlined portion). In accordance with an exemplary embodiment, further diagnostic information can be pulled out from other modules at this timestamp for reporting to the customer care center.
[2019-03-29 13:15:52.175] [89.984657]
[2019-03-29 13:15:52.175] [89.984684] lmac_24g=========LMAC Config=========
[2019-03-29 13:15:52.175] [89.984685] lmac 24g HW version: B0
[2019-03-29 13:15:52.175] [89.984686] lmac_24g PHY type: ELMA
[2019-03-29 13:15:52.190] [89.984687] lmac_24g PCIE type: SYNOPSYS PCIE [2019-03-29 13:15:52.190] [89.984688] lmac_24g MAC LA status: ON
[2019-03-29 13:15:52.190] [89.984689] lmac_24g==============================
[2019-03-29 13:15:52.206] [90.028289] [ChannelInfo]: new group: [1-13], max EIRP=20 dBm, flags=0 [2019-03-29 13:15:52.207] [User Voice Report:] Intermittent macro-blocks seen for the last 10 seconds or so
[2019-03-29 13:15:52.207] [User Voice Report:] with a few jitters. Sub-titles are not clear as well.
[2019-03-29 13:15:52.207] [User Voice Report:] Retrieving additional diagnostics . . . [TUNER],[UCS], [AV] . . .
[2019-03-29 13:15:52.222] [90.048785] CL2400_5g: cl2400_5g_bss_isolation_status, is_loaded=1
[2019-03-29 13:15:52.237] [90.061325] CL2400_24g: cl2400_24g_bss_isolation_status, is_loaded=1 [2019-03-29 13:15:56.804] [93.102526] lmac 24g [CE] Start processing MM_START_REQ message
[2019-03-29 13:15:56.835] [93.109228] lmac_24g------------u32chip_id=5, u32chip_rev=1---------

[2019-03-29 13:15:56.835] [93.118414] lmac_24g phy_hw_set_channel(freq=2412, freq1=2412, chantype=0, index=0

[2019-03-29 13:15:56.835] [93.126913] lmac 24g ##module_id=2, dsp_ver=701.6.0, platform_type=1

[2019-03-29 13:15:56.835] [93.134728] lmac 24g using power gain table mode of 0

[2019-03-29 13:15:56.835] [93.140515] lmac_24g [CE] Finish processing MM_START_REQ message In accordance with an exemplary embodiment, at time [2019-03-29 13:15:52.207], in addition, to the user's voice getting recorded as text in the logs, appropriate diagnostic information is pulled from all other modules into the logs to aid debugging at the customer center.

Figure 3:
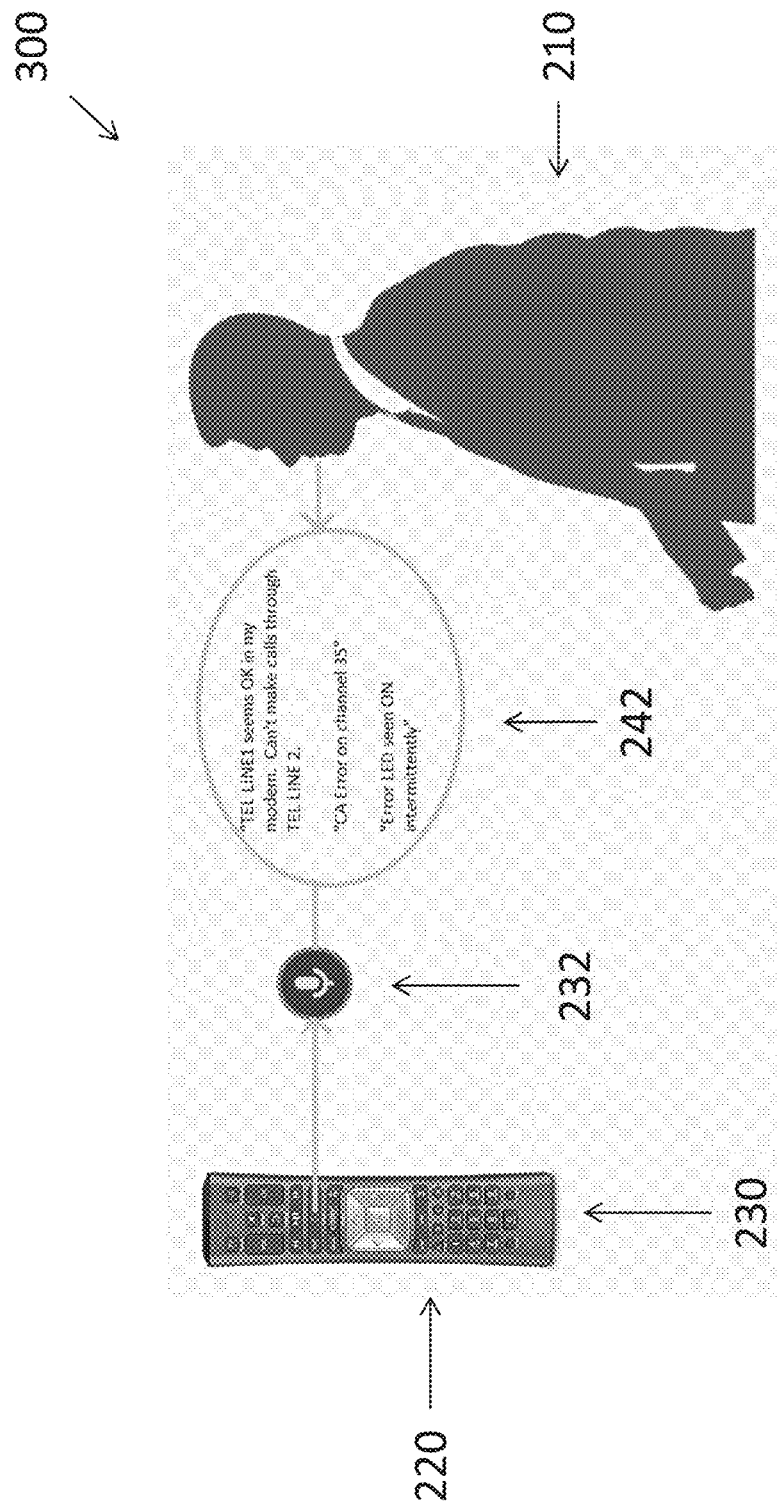
FIG. 3 is another illustration of a user communicating or interacting with a remote controller (RC) in accordance with an exemplary embodiment.

In accordance with an exemplary embodiment, in case of multiple CPE devices 120, 130a, 130b, 130c, 130d, 130e, (for example, a set-top, cable modem, etc.), since the root cause could be sourced to any of the devices, the user's observations can be logged by each of the devices 120, 130a, 130b, 130c, 130d, 130e, with the appropriate time stamp and related diagnostic information. In accordance with an exemplary embodiment, for example, when the customer care representative sees the same problem reported in both the set-top 130c and the network gateway 120, i.e. cable modem at a specific time, looks into the related diagnostics of the set-top 130c and the network gateway 120, i.e. cable modem individually and the customer care representative now has a much higher chance of finding the root-cause and fixing the same. In accordance with an exemplary embodiment, as shown in FIG. 3, the user's observation may also span multiple devices 120, 130a, 130b, 130c, 130d, 130e.

In accordance with an exemplary embodiment, when the customer observes problems with the device functions, the traditional method of customer service calls is not always effective due to the below reasons, which can include:

Problem 1: The device 120, 130a, 130b, 130c, 130d, 130e might not have logged the problem. For example, even if the problem's presence was partially revealed by some of the logs, the exact time when it was observed by the user would not be captured.

Problem 2: Developers cannot see the customer's observations.

Problem 3: Manual reporting can be both cumbersome and expensive.

Problem 4: Limited information may make reproducing the issue very hard at the customer care or the development center.

Problem 5: Round trip cycle time of reporting the bug and fixing the same can be high.

In accordance with an exemplary embodiment, a method of automating bug reporting is disclosed for in-home CPE devices 120, 130a, 130b, 130c, 130d, 130e having a remote controller (RC) 220. For example, bug reporting can include software bug, which is an error, flaw or fault in a computer program or system that causes it to produce an incorrect or unexpected result, or to behave in unintended ways, or hardware related issued. In the absence of voice recording function 232 on the remote controller (RC) 220, a combination of RC buttons 230 can be programmed or used by customer 210 to trigger the automatic bug reporting. With the support of voice commands, the customer can provide additional details of the problem that the customer is observing. Since the problem may be related to other in-home CPE devices 120, 130a, 130b, 130c, 130d, 130e, the CPE device 120, 130a, 130b, 130c, 130d, 130e can send the user's observations (with the timestamp) to the other devices 120, 130a, 130b, 130c, 130d, 130e for their own internal logging and collection of diagnostic information.

In accordance with an exemplary embodiment, with voice command support, the CPE device 120, 130a, 130b, 130c, 130d, 130e can translate customer voice to text. The text is then parsed to identify keywords/hints to know which in-home CPE devices 120, 130a, 130b, 130c, 130d, 130e are involved and what platform functional modules may be related to the problem the customer 210 is attempting to report. In accordance with an exemplary embodiment, debug log levels of related software modules can be increased to capture finer details about the incident. For example, in-home CPE devices 120, 130a, 130b, 130c, 130d, 130e can interact with each other in-home CPE devices 120, 130a, 130b, 130c, 130d, 130e to gather more details about the incident.

In accordance with an exemplary embodiment, below is list of details that, for example, can be gathered as part of an incident:

1. Customer voice recording (translated text description) along with the timestamp for remote controllers (RCs) 220 with voice support. For legacy remote controllers (RCs) (i.e., remote controllers without voice support) 220, the timestamp is used as a marker while collecting further details from the customer through other means.
2. Device logs captured with increased log levels at the time of the incident.
3. Details about the in-home ecosystem or devices.
4. Statistics or event details of in-home devices at the time of the incident.

In accordance with an exemplary embodiment, remote controller (RC) key combinations 230 can be used to register bug reporting. For example, the customer can enter detailed text messages on the issue (or problem) using the RC key pad 232. Bug report timestamps are noted and items 2, 3, 4 listed above can be uploaded to service provider 110 as part of a bug report. In accordance with an exemplary embodiment, the text message when present can be parsed to identify if any other in-home devices 120, 130a, 130b, 130c, 130d, 130e are involved in the bug scenario. For example, if other problem exist, then using internal communication, in-homes devices 120, 130a, 130b, 130c, 130d, 130e can be contacted to get log and event details and statistics from those CPE devices 120, 130a, 130b, 130c, 130d, 130e.

In accordance with an exemplary embodiment, in the case the speech file can be shared to service provider 110 along with the other details, which can be provide an enhanced customer experience, improved and technology evolved bug reporting approach, which can translate to rather significant cost savings to CPEs or Wi-Fi devices 120, 130a, 130b, 130c, 130d, 130e, which can be implemented on existing CPE/Wi-Fi devices 120, 130a, 130b, 130c, 130d, 130e, without hardware changes.

In accordance with an exemplary embodiment, the CPE device 120 may detect an internal anomaly and the customer might not report any anomalies and/or troubles to trigger bug reporting as disclosed herein. Accordingly, for example, the CPE device 120 may be configured to prompt the customer, for example, via text and/or voice to verify or confirm if the customer is observing any problems or issues with the CPE device 120. If, upon prompting, the user does identify any problems or issues with the CPE device 120, additional information can be obtained from the customer, for example, by asking preferred or preset questions, which have been stored within the CPE device 120 and/or a cloud server hosted by the service provider to provide additional input and/or confirmation of the existing problem or issue.

Upon receipt of the additional input and/or confirmation from the customer the report bug can be generated by collating the device logs and customer information.

Figure 4A:
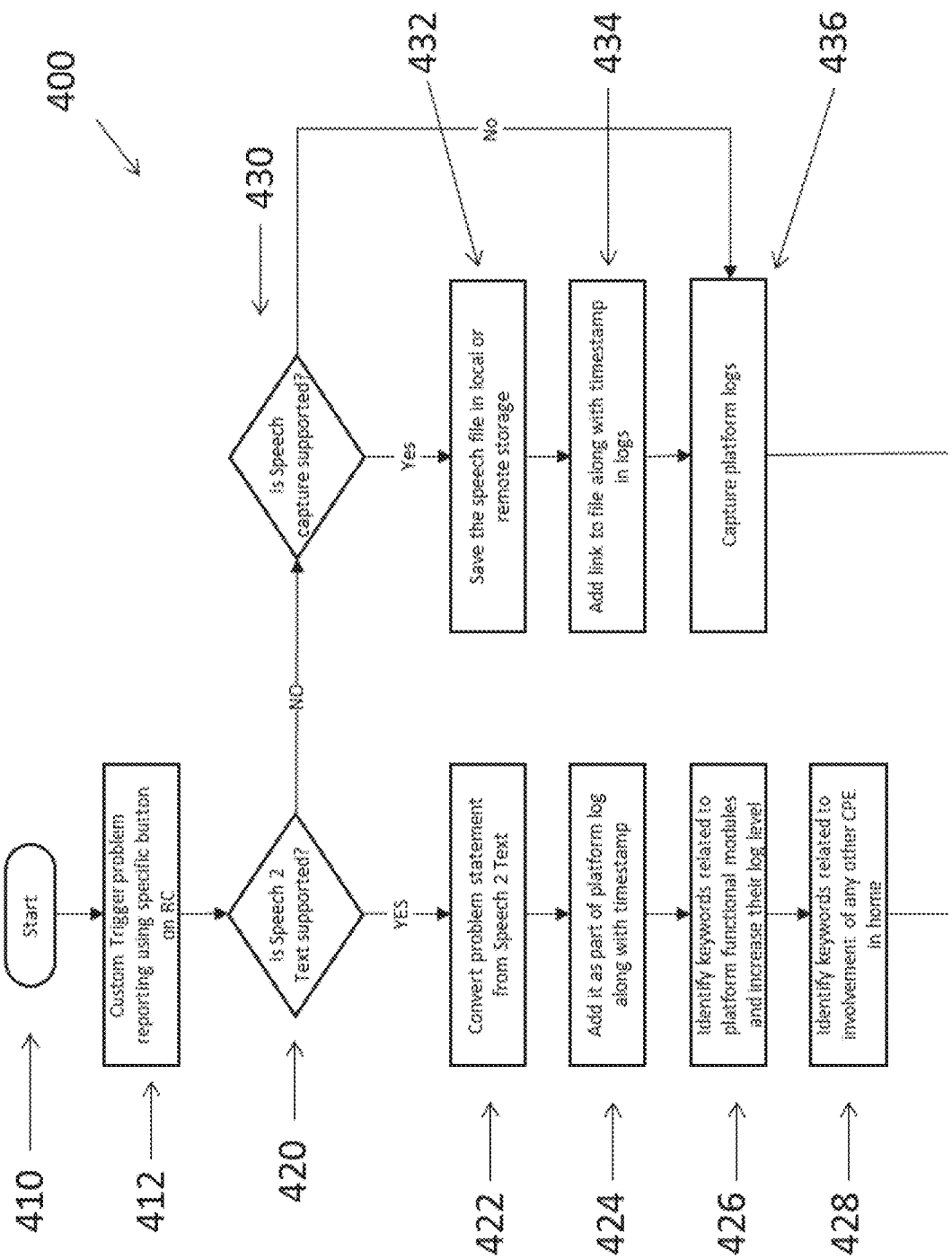
FIGS. 4A and 4B is a flow chart illustrating a method for advanced customer bug reporting in accordance with an exemplary embodiment.
Figure 4B:
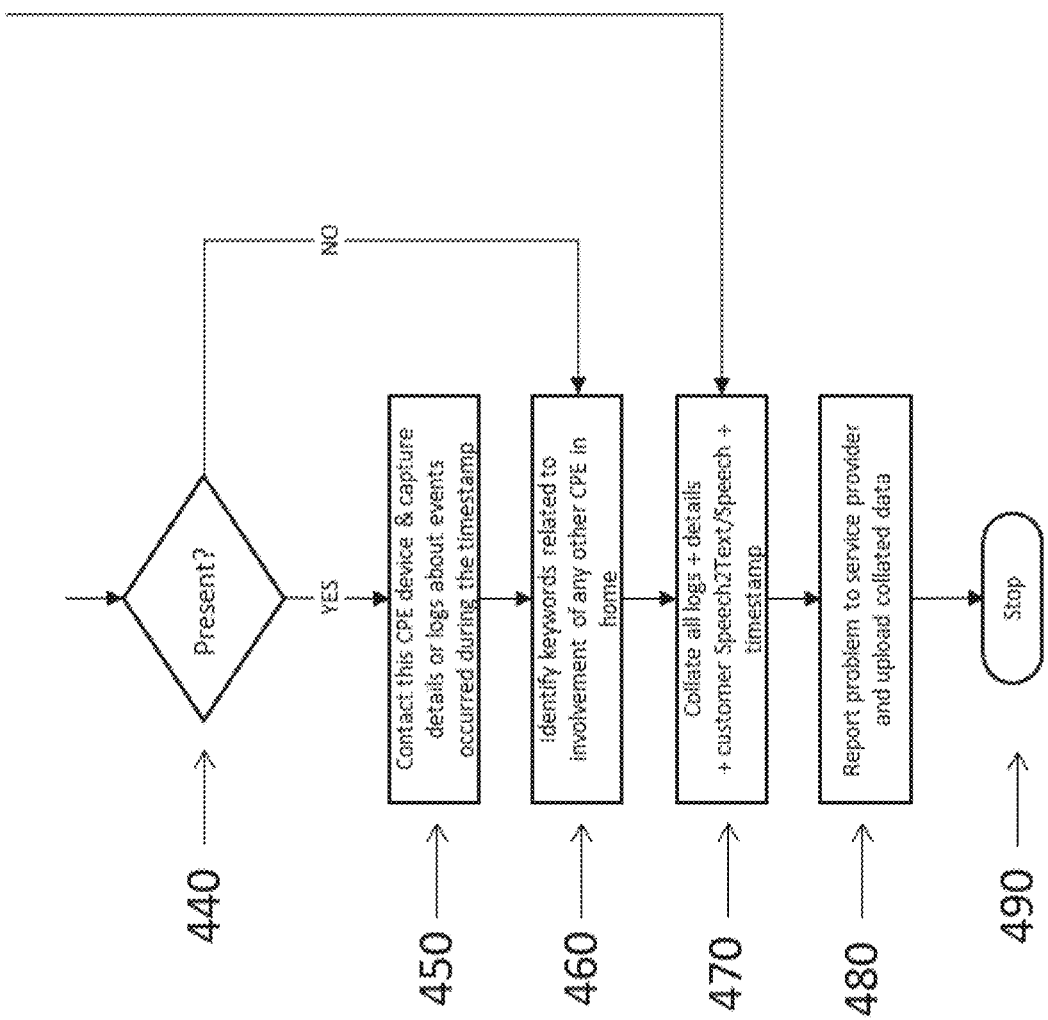

FIGS. 4A and 4B is a flow chart 400 illustrating a method for advanced customer bug reporting in accordance with an exemplary embodiment. In accordance with an exemplary embodiment, the process starts in step 410. In step 412, the customer reports the problem using a specific button 230, 232 on the remote controller (RC) 220. In step 420, a determination is made if the remote controller (RC) 220 supports speech to text. If the remote controller (RC) 220 supports speech to text (Speech 2 Text), the process continues to step 422. In step 422, the process converts the problem statement from speech to text. In step 424, the converted speech to text from step 422 is added as part of the platform log along with a timestamp. In step 426, keywords related to the platform functional modules are identified and increase the keywords log level. In step 428, keywords related to involvement of any of the CPE devices 130a, 130b, 130c, 130d, 130e of the cable service provider 110 can be identified.

In accordance with an exemplary embodiment, in step 440, a determination is made if the CPE device 120 is presently active. If the CPE device 120 is presently active, in step 450, the CPE device 120 can be contacted and details or logs about the events that have occurred during the timestamp are captured. If the CPE device 120 is not present or active, or once the CPE device 120 has been contacted in step 450 has been contacted, the process continues to step 460 where keywords related to involvement of any other CPE devices 120 in the home and/or business are identified. In step 470, the system and method collates all logs, details, and customer speech to text/speech, and timestamp. In step 480, the problems are reported to service provider 110 and the collated data from step 470 is uploaded. In step 490, the process ends.

In accordance with an exemplary embodiment, if the remote controller (RC) 220 does not support speech to text (Speech 2 Text) in step 420, the process continues to step 430 where a determination is made of the remote controller (RC) 220 supports capturing speech. If the remote controller (RC) 220 supports capturing speech, the process continues to step 432 where the speech file is saved in a local or a remote storage. The process then continues to step 434 where a link is added to the file along with timestamps in the logs. The process then continues to step 436 where the platform logs are captured.

In accordance with an exemplary embodiment, if the remote controller (RC) 220 does not support speech (i.e., legacy remote controller (RC) 220), the process continues to step 436 where the platform logs are captured.

After the platform logs are captured in step 436, the process continues to step 470 where all logs, details, and customer speech to text, speech, and timestamps are collated. The process then continues to step 480, where the problems are reported to service provider 110 and the collated data from step 470 is uploaded. In step 490, the process ends.

Computer System Architecture

Figure 5:
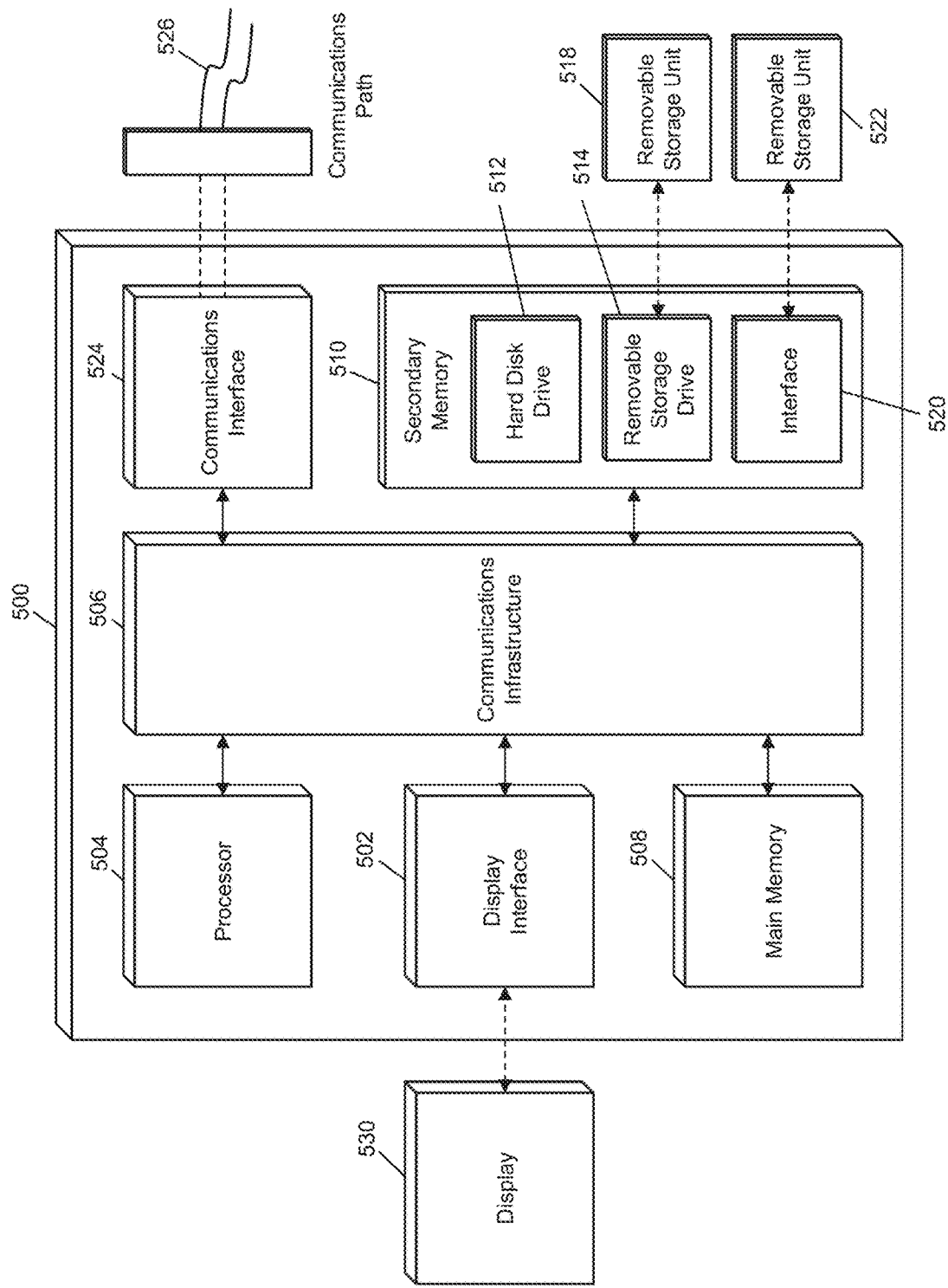
FIG. 5 is an exemplary hardware architecture for an embodiment of a communication device.

FIG. 5 illustrates a representative computer system 500 in which embodiments of the present disclosure, or portions thereof, may be implemented as computer-readable code. For example, the one or more servers 112, the network gateway 120, and the plurality of devices 130a, 130b, 130c, 130d, 130e of FIG. 1 may be implemented in whole or in part by a computer system 500 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the present exemplary embodiments.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this representative computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 505, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 1-4B, as discussed herein. Accordingly, such computer programs may represent controllers of the computer system 500. Where the present disclosure is implemented using software executed on hardware, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software executed on hardware, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for reducing service impact to users during image and/or firmware changes. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for capturing observations of customer-premise equipment or customer-provided equipment (CPE) devices, the method comprising:
   receiving a user report indicating a problem detected by a user during use of a customer-premise equipment or customer-provided equipment (CPE) device, the user report being received in response to activation of one or more specific buttons on a remote controller;
   entering the user report into a log with a timestamp;
   identifying one or more other customer-premise equipment or customer-provided equipment (CPE) devices involved in the problem;
   in response to entering the user report into the log, determining the customer-premise equipment or customer-provided equipment (CPE) device is presently active;
   in response to determining the customer-provided equipment (CPE) device is presently active, contacting the customer-premise equipment or customer-provided equipment (CPE) device; and obtaining additional details or logs about the problem from the customer-provided equipment (CPE) device.

2. The method according to claim 1, wherein the one or more specific buttons initiates a voice recording function on the remote controller to trigger capture of the user report.

3. The method according to claim 1, comprising:

programming a plurality of buttons on the remote controller to trigger the reporting of the problem.

4. The method according to claim 2, wherein the user report is a user voice recording including speech describing;

converting the speech to text; and adding the text to the log with the timestamp of the problem.

5. The method according to claim 4, further comprising:

parsing the text to identify keywords; and wherein the identifying one or more other customer-premise equipment or customer-provided equipment (CPE) devices involved in the problem includes:

identifying other customer-premise equipment or customer-provided equipment (CPE) devices that may be involved with the problem based on the keywords.

6. The method according to claim 1, further comprising:

sending the problem with the timestamp to another customer-premise equipment or customer-provided equipment (CPE) device; and entering the problem into the log of the another customer-premise equipment or customer-provided equipment (CPE) device.

7. The method according to claim 1, comprising:

identifying platform functional modules or software modules related to the problem based on the user report of the problem.

8. The method according to claim 1, comprising: uploading the reported problem to a service provider as part of a bug report.

9. The method according to claim 1, wherein the receiving the user report is in response to:

detecting an internal anomaly and/or trouble with the customer-premise equipment or customer-provided equipment (CPE) device; and prompting the user to verify the anomaly and/or trouble.

10. The method according to claim 1, further comprising:

collating logs, details, customer speech to text/speech, and timestamps on the problem; and uploading the collated logs, details, customer speech to text/speech, and timestamps on the problem to a cable service provider for analysis.

11. A system for capturing observations of users of customer-premise equipment or customer-provided equipment (CPE) devices, the system comprising:

a customer-premise equipment or customer-provided equipment (CPE) device; and a remote controller, the remote controller configured to:

receive a user report indicating a problem detected by a user during use of the customer-premise equipment or customer-provided equipment (CPE) device, the user report being received in response to activation of one or more specific buttons on the remote controller, enter the user report into a log with a timestamp, and identify one or more other customer-premise equipment or customer-provided equipment (CPE) devices involved in the problem;

in response to entering the user report into the log, determine the customer-premise equipment or customer-provided equipment (CPE) device is presently active:

in response to determining the customer-provided equipment (CPE) device is presently active, contact the customer-premise equipment or customer-provided equipment (CPE) device; and obtain additional details or logs about the problem from the customer-provided equipment (CPE) device.

12. The system according to claim 11, wherein the one or more specific buttons initiates a voice recording function on the remote controller to trigger capture of the user report.

13. The system according to claim 11, comprising:

a plurality of buttons on the remote controller configured to be programmed to trigger the reporting of the problem.

14. The system according to claim 12, wherein the user report is a user voice recording including speech describing the problem with the timestamp, the remote controller further configured to:

convert the speech to text; and add the text to the log with the timestamp of the problem.

15. The system according to claim 14, wherein the remote controller is further configured to:

parse the text to identify keywords; and wherein the identifying one or more other customer-premise equipment or customer-provided equipment (CPE) devices involved in the problem includes:

identifying other customer-premise equipment or customer-provided equipment (CPE) devices that may be involved with the problem based on the keywords.

16. The system according to claim 11, wherein the problem with the timestamp is sent to another customer-premise equipment or customer-provided equipment (CPE) device, and the problem is entered into the log of the another customer-premise equipment or customer-provided equipment (CPE) device.

17. The system according to claim 11, comprising:

identifying platform functional modules or software modules related to the problem based on the user report of the problem.

18. The system according to claim 11, wherein the reported problem is uploaded to the cable service provider as part of a bug report.

19. The system according to claim 11, wherein logs, details, customer speech to text/speech, and timestamps on the problem are collated, and the collated logs, details, customer speech to text/speech, and timestamps on the problem are uploaded to the cable service provider for analysis.

20. The system according to claim 11, wherein prior to the receiving the user report the customer-premise equipment or customer-provided equipment (CPE) device is configured to:

detect an internal anomaly and/or trouble with the customer-premise equipment or customer-provided equipment (CPE) device; and prompt the user to verify the anomaly and/or trouble.

* * * * *